Jan. 27, 1959   J. R. OLIVER   2,871,112
METHOD OF ETCHING FOR DUPLICATING IN A METALLIC
PIECE A PATTERN FORMED BY RECESSED AREAS
IN THE SURFACE OF A MASTER PIECE
Filed April 25, 1956   3 Sheets-Sheet 1
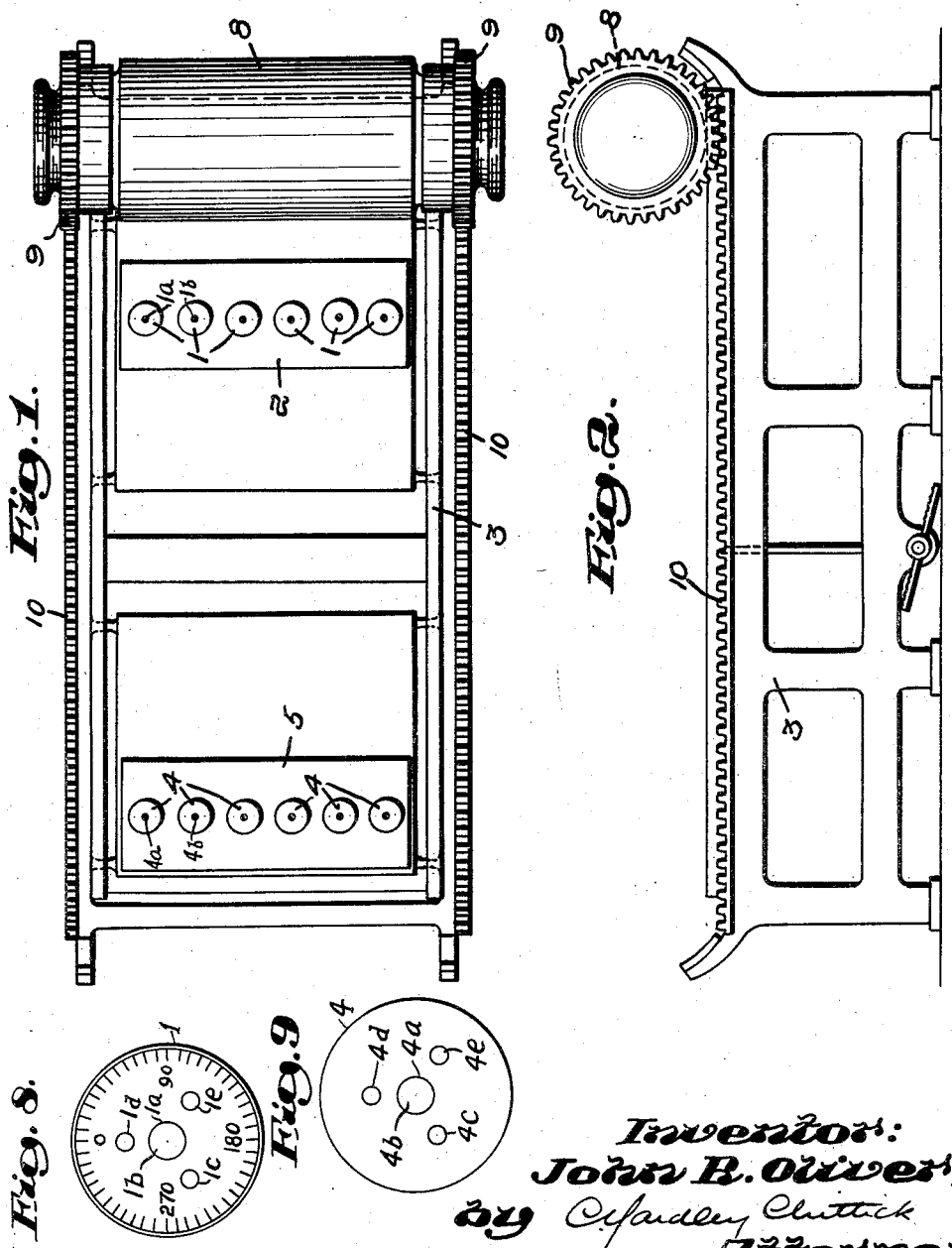

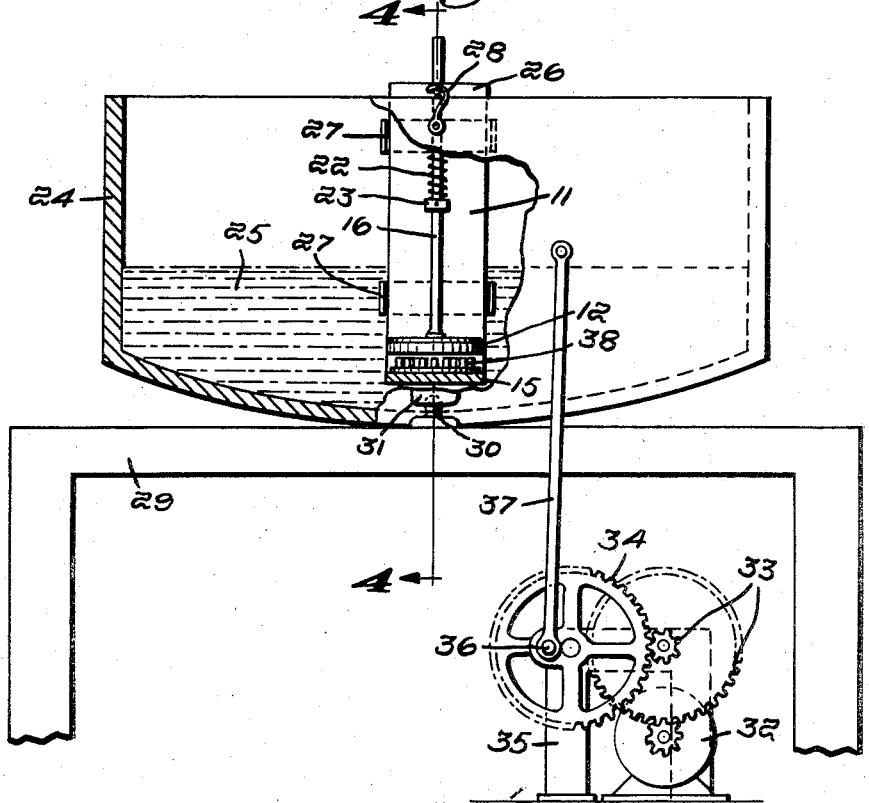
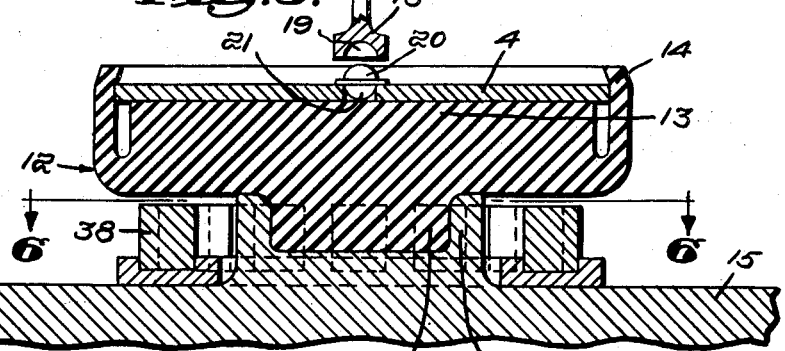

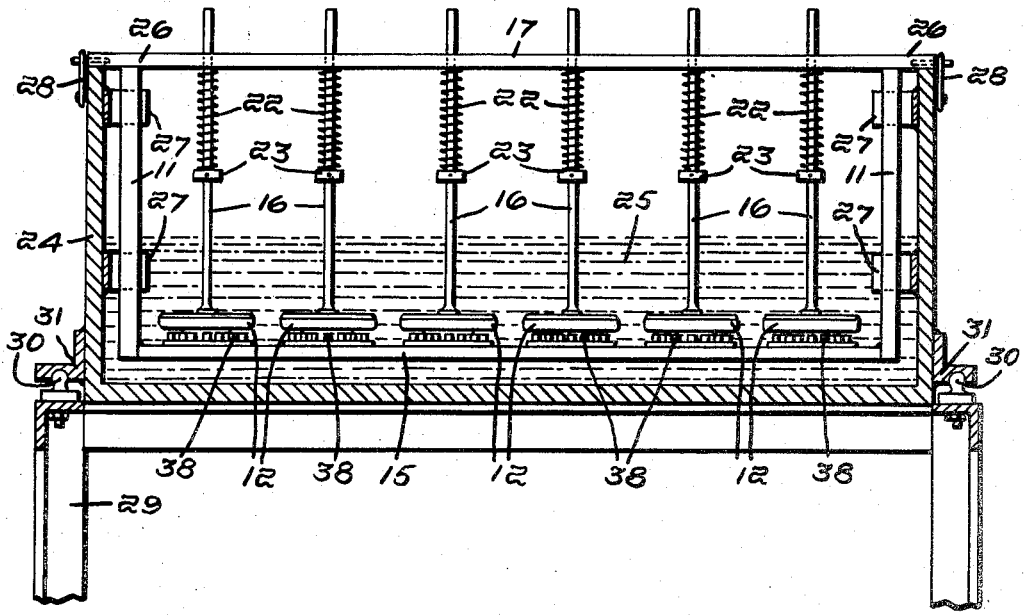
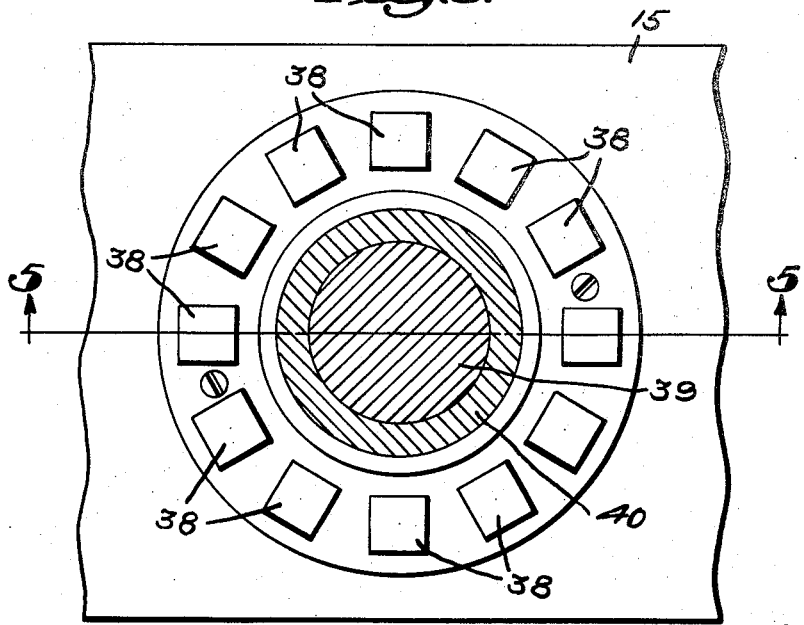

United States Patent Office 2,871,112
Patented Jan. 27, 1959

2,871,112

METHOD OF ETCHING FOR DUPLICATING IN A METALLIC PIECE A PATTERN FORMED BY RECESSED AREAS IN THE SURFACE OF A MASTER PIECE

John R. Oliver, Boston, Mass.

Application April 25, 1956, Serial No. 580,666

20 Claims. (Cl. 41—43)

This invention relates to a method of duplicating in a ferrous work piece by an etching process a pattern or design which is formed in intaglio, that is, by depressed areas, in a master piece, and one object of the invention is to provide novel means by which the pattern or design carried by the master piece will be duplicated with precise accuracy on the work piece. This application is a continuation-in-part of my application Serial No. 456,256, filed September 15, 1954, now abandoned, which latter application was a continuation-in-part of my application Serial No. 368,962, filed July 20, 1953, now abandoned.

In carrying out this method the face of the master piece is coated with an ink or coating compound which is applied to the raised portions only of the surface of the master piece, the depressed areas which define the pattern or design being free from the ink or coating. The master piece is preferably made of non-magnetic, non-corrodible material such as stainless steel or a suitable plastic, but in certain conditions the master piece may be made of magnetic material. The master piece is a precision machined part of great accuracy as to the pattern thereon and the relation of the pattern to the periphery of the piece. An ink impression is then made of the master piece, and transferred to the work piece, the result being that the design or pattern to be duplicated on the work piece will be defined by the portions of the surface of the work piece which are free from ink, such portions corresponding to the depressed areas in the master piece.

The work piece, like the master piece, is precision machined, being identical in size and configuration so that the resulting design on the work piece will not only be a duplicate of that on the master piece but will also be located identically with respect to the periphery of the work piece. In furtherance of the exact duplication requirements, the work piece and master piece are secured in their respective positions during the time of the ink transfer process by locating means of great accuracy and the ink transfer means is of a similar degree of precision.

The ink or coating which is used for this purpose is an acid resisting ink and after the ink impression has been thus transferred to the work piece the latter is subjected to the action of an etching fluid which will attack the un-inked portions only of the surface of the work piece, the other portions of said surface being protected by the acid resistant ink covering.

An important feature of the invention is novel means for stabilizing the ink coating on the work piece during the etching process so as to maintain immovable the pattern defining edges of the inked surface of the work piece. By thus stabilizing the ink coating and the pattern defining edges thereof the pattern or design which is etched on the surface of the work piece will be a precise duplicate of that carried by the master piece.

The stabilizing of the ink coating is accomplished by incorporating in the acid resistant ink particles of ferro magnetic material which may or may not be magnetized. The ink with the particles therein becomes a much more stable substance in itself than the ink without the particles and thus offers improved pattern maintenance when transferred to the work piece. If, in addition, the work piece is magnetized, there will be an increased bond and better pattern maintaining properties as the ferro magnetic particles are drawn to and held in position by the work piece. In a third arrangement which gives the ultimate in pattern maintenance, both the ferro magnetic particles and the work piece are magnetized to hold the particles on the work piece with even greater security.

By the foregoing procedures, the accurately transferred ink impression will be held immovable during the etching operation, thereby to give a duplicated pattern equal in accuracy to that of the pattern in the master piece.

The ink transfer means, one form of which is shown in the drawing must function to place the pattern formed by the particle carrying ink on the work piece in the same relative position the pattern has on the master piece. When the term "passing a roller, etc." over the master piece and thence over the work piece is used in the claims, it is to be understood that such language is intended to cover any means for accomplishing the transfer of the coating so as to present an accurate duplicated pattern on the work piece.

A further object of my invention resides in the use of an off-set press having a press roll whereby my etching process may be accomplished in a novel and economical manner. While it has been indicated that broadly any type of suitable means may be utilized for transferring the acid resisting ink or coating from the master piece to the work piece, still I consider as part of my invention the manner of utilization of an off-set press to accomplish this result.

In one form of my invention, as explained above, the acid resistant ink is stabilized by incorporating therein particles of ferro magnetic material to which magnetic force may be applied during the etching process. When such coating is used the accuracy of the resulting pattern in the work piece when etched is of high degree and therefore, when great precision is required such coating will be used. In many other situations, however, the reproduced pattern need not be of such a high degree of accuracy provided the resulting product may be made with great economy. In such instances I have found that I may use an acid resistant coating or ink which does not have incorporated therein the ferro magnetic particles and the use of magnetic force for holding the particles in position on the work piece during etching may be eliminated. The finished work piece when made with ordinary acid resistant ink will not have as sharp definition as when made with the particle containing ink but nevertheless such pieces, because of the good but not superior degree of accuracy, combined with the low cost made possible through the use of an off-set press having a press roll, is considered as constituting a distinct advance in the low cost metallic duplicating field.

Accordingly, I consider additionally as my invention the method of reproducing a pattern on a work piece through the utilization of an off-set press having a press roll by which a suitable acid resistant coating with or without ferro magnetic particles therein, is transferred from a master piece to a work piece, thereby to apply to the work piece an exact reproduction of the pattern found on the master piece. That is to say, so long as the coating that is transferred from the master piece to the work piece is of sufficient stability to hold its position on the work piece during the etching process to produce a commercially accepted article, it is immaterial with respect to this phase of the invention whether the acid resistant coating does or does not contain the stabilizing metallic particles.

In order to give an understanding of the invention I have illustrated in the drawings an apparatus by which the method may be carried out, in which:

Fig. 1 is a plan view of a device for transferring the ink impression from the master piece to the work piece.

Fig. 2 is a side view of Fig. 1.

Fig. 3 is a view with parts broken out illustrating a device for subjecting the work piece to the action of the etching fluid.

Fig. 4 is a section on the line 4—4 of Fig. 3.

Fig. 5 is an enlarged sectional view illustrating a holder in which the work piece is held during the application of the etching fluid thereto.

Fig. 6 is a section on the line 6—6 of Fig. 5.

Fig. 7 is a view illustrative of one way of applying the acid resistant ink or coating to the master piece.

Fig. 8 shows a master piece in which the indicia that have been engraved thereon are in particular angular orientation with respect to certain physical aspects of the master piece.

Fig. 9 shows a work piece identical in structure to the master piece shown in Fig. 8 prior to the application of the indicia through the process of this invention.

An apparatus that is particularly suitable for carrying out the method of my invention is an offset press having a press roll. The press is modified to the extent that it will accommodate a single master piece and a single work piece, or it may be made so that it will accommodate a plurality of master pieces of non-magnetic material and an equal number of work pieces. The device shown in the drawings is designed to accommodate a plurality of master pieces (six master pieces being shown in Fig. 1), and an equal number of work pieces.

The master pieces are indicated at 1 and they are shown as arranged in a line and carried by a suitable supporting member 2 which is mounted in a frame 3. The work pieces are indicated at 4, there being one work piece for each master piece. These work pieces are shown as arranged in a line and mounted on a suitable support 5 also carried by the frame 3. Each master piece 1, as well as each work piece 4, will preferably have a flat top surface and each master piece carries the pattern or design in intaglio, that is, a design which is formed or defined by depressed areas in the surface of the master piece.

The master pieces have one or more accurately located holes 1a, extending therethrough which cooperate with precisely located pins 1b to hold the master pieces in exact position.

The first step in the operation is to apply a suitable coating to the flat face of each master piece, such coating being applied in such a way that it does not enter into the depressed areas, but remains entirely on the raised flat surface.

The coating is an acid resistant coating and may be in the nature of an ink and where great accuracy is required the coating should contain particles of ferro magnetic material for a purpose presently to be described. The particles may or may not be magnetized.

The flat raised surfaces of the master pieces may be supplied with the acid resistant coating in any suitable way as by means of an ink roller 6 (see Fig. 7) which is supplied with the ink or coating material and which can be rolled over the flat faces of the master pieces. This may be done by hand, in which case the roller 6 may be equipped with handles 7 by which it can be readily manipulated.

After the master pieces 1 have been thus supplied with a coating of acid resistant ink, an ink impression is made of each master piece and such ink impression is transferred to the flat surface of the corresponding work piece. The ink impression which is taken from each master piece will show the pattern of the master piece by the un-inked portion of the ink impression and when the ink impression has been transferred to the work piece the un-inked portions of the work pieces define the pattern carried by the master pieces.

This taking of the ink impression of the master piece and transferring it to the work piece may be accomplished in any approved way, but the best and most efficient procedure of which I am aware is through the use of an offset press in which the press or transfer roll 8 has a surface of rubber or other suitable material which is mounted so as to roll over the inked master pieces 1, thereby picking up an ink impression from each master piece, and which is also mounted to roll over the work pieces 4, thereby to transfer the ink impressions thereto. The roll 8 is made with a circumferential dimension equal to the distance between the row of master pieces 1 and the row of work pieces 4, and said roll is shown as having a gear 9 at each end which meshes with and rolls over a stationary rack 10 with which the frame 3 is provided. After the transfer roll 8 has rolled over the master pieces 1 and picked up an ink impression from each master piece a complete rotation of the roll will bring the ink impressions thereon directly over and into registering contact with the work pieces 4 and thereby the ink impression on the transfer roll is transferred to the work pieces. The flat face of each work piece will receive a coating of ink over that portion thereof corresponding to the raised portion of the work piece, but the portion of the surface of the work piece corresponding to the pattern or design on the master piece will be free from ink.

In order that the impression will be placed accurately on the work piece, which is a duplicate of the master piece in dimension, the work piece must be precisely located. This is accomplished by having holes 4a in the work piece (located similarly to the holes 1a in the master pieces) and pins 4b positioned to hold the work pieces so that the impression received from the transfer roll will be in the same registration as the original design on the master piece.

In those cases where it is important that the indicia be exactly angularly oriented with respect to certain physical features of the master and working pieces, means is provided to insure that such orientation of the indicia or pattern will appear in the work piece exactly the same as it appears in the master piece. Thus, in Fig. 8, is shown a master piece having in addition to the central hole 1a, three secondary locating holes 1c, 1d and 1e spaced 120° apart. This illustrative master piece carries indicia in the form of a 360° scale very exactly located with respect to the circumference and the zero mark is exactly aligned with the centers of the holes 1d and 1a. When master pieces of this construction are positioned on the holding member 2, there will be additional pins to extend into any one or all of the holes 1c, 1d and 1e in addition to the pin 1b so that the master piece will not only be held against rotation, but also the angular orientation of the indicia will be exactly maintained.

If the transferred pattern of the indicia found on the master piece is to be applied to the work piece 4 with the scale correctly angularly oriented with respect to the three mounting holes 4c, 4d and 4e of the work piece 4, it will be necessary to provide suitable mounting pins on supporting member 5 to hold the work piece 4 in an angular position corresponding exactly to work piece 1. That is to say, the line passing through the centers of holes 4d and 4a must be parallel with the line passing through the centers of holes 1d and 1a. Of course, as previously indicated, the pieces 1 and 4 are longitudinally aligned and spaced a distance equal to one circumference of roller 8. To accomplish this result requires very careful and exact arrangement of the pins that extend into the locating holes of the master and work pieces, but once the construction has been properly made, no further adjustment is necessary. Thus, by this method, it is possible to finish completely the work pieces as to their dimensions identical with the master piece, and then when the work pieces are positioned on their pins on supporting member 5, the pattern of the indicia on the master pieces will be transferred from the master pieces by the roll 8 to the work pieces with great accuracy as to the pattern itself and the orientation of the pattern with respect to the other configurations in the two pieces which in Figs. 8 and 9 shown, take the form of locating holes spaced at 120°. Obviously, other physical configurations might be present in the master and work pieces with which the indicia is to be aligned and oriented as for example a square hole in the center of each piece with the indicia oriented with respect to one corner of the square hole. Similarly, the master and work pieces might be square or rectangular instead of round in which case it is obvious that the transferred pattern to be correctly applied to the work piece would require that the square or rectangular work piece be angularly arranged to agree exactly with the angular position of the master piece.

After each work piece has thus been provided with the pattern defining ink coating, said work piece is placed in a bath of etching fluid which will attack the uninked portion of the face of the work piece but will not attack the portion of the face which is covered with the acid resistant ink material and thereby the pattern or design will be etched on the face of the work piece.

I have stated above that when great accuracy is required the ink or coating material should include therein ferro magnetic particles. While ink without particles therein will give adequate reproductions when only ordinary accuracy is required, and particle containing ink when used without magnetic influences will give better reproductions because of the greater stability of the coating, still a much improved degree of accuracy can be obtained by magnetically holding in fixed position the ferro magnetic particles in the ink coating on the work piece, thereby to stabilize the pattern defining edges of the ink coating to prevent any distortion thereof during the etching operation. If the particles in the ink have been magnetized before application to the master piece, then extra strong attraction will occur when the work piece is subjected to the magnetic means that functions during the etching process to hold the ink in proper position.

For subjecting the work pieces to the action of the etching fluid there is shown in Fig. 4 a rectangular frame 11 which carries a plurality of work piece holders 12, each being shown as made of rubber, and each having a central supporting portion 13 on which a work piece can be placed, and each also have an upwardly directed retaining lip 14 which resiliently engages the peripheral edge of the corresponding work piece and thus holds it in position. This lip 14 also makes a tight joint with the peripheral edge of the work piece and prevents any of the etching fluid from working underneath the edge of the work piece and thus attacking the back side thereof.

These holders 12 are mounted on the bottom rail 15 of the holder 11, as shown in Fig. 4. The said rail is shown as having a plurality of upstanding circular bosses 40, one for each holder 13, each boss having a recess 41 to receive a depending projection 39 on the holder 12.

The frame 11 also carries a plurality of spring-pressed hold-down elements, one for each work piece, said elements serving to yieldingly hold each work piece on the supporting portion 13 of the holder during the etching process.

Each hold-down member presents a stem portion 16 which extends through the upper rail 17 of the frame 11, each stem having at its lower end a head 18 provided with a socket 19 to engage a member 20 which is partially received in a central opening 21 with which the work piece 4 is provided. Each stem 16 is acted upon by a spring 22, the upper end of which engages the upper rail 17, and the lower end of which engages a collar 23 carried by the stem. The spring 22 thus holds the head 18 yieldingly against the member 20, and thereby the work piece is not only correctly centered in the holder, but is firmly held in position.

The frame 11 carrying the work pieces is adapted to be removably mounted in a tank or vat 24 carrying the etching fluid 25. The top rail 17 of the frame 11 is provided at each end with an extension 26 which is adapted to rest on the top edge of the vat when the frame is deposited therein and the side walls of the vat are provided with guide elements 27 to cooperate with the vertical sides of the frame 11 to hold the latter in position. The frame 11 may be locked in place by suitable latches 28.

The vat 24 is mounted for rocking movement on a supporting frame 29 for which purpose said frame 29 has two ball-shaped supports 30 and each side of the vat has a bracket 31 provided with a socket to receive the ball. The rocking movement may be given to the vat in any suitable way and I have herein shown for this purpose a motor 32 which is connected by suitable reducing gearing 33 to a gear 34 carried by a frame 35, said gear 34 having a crank pin 36 connected by a connecting rod 37 to the vat 24 at one side of its rocking axis. The vat is thus given a rocking movement which will cause the etching fluid to be agitated and thereby to do a better etching job.

During the time that the work pieces are mounted in the frame 11 they are subjected to magnetic influence which cooperates with the ferro-magnetic particles in the ink to hold said particles firmly in position and thereby stabilize the position of the pattern defining edges of the ink impression on the work piece. This may be accomplished either by making the work piece of magnetized material so that the ferro magnetic particles in the ink will be strongly attracted thereto, or by associating with each holder 12 a suitable magnet 38 which is located beneath the holder, as shown in Fig. 5, and which has magnetic attraction for the ferro magnetic particles in the ink on the surface of the work pieces. In either event such ferro magnetic particles will be magnetically stabilized in fixed positions and thereby the pattern defining edges of the ink impression and the entire included inked area on each work piece will be stabilized and will be prevented from becoming distorted by the sloshing movement of the etching fluid 25 during the etching process. The pattern which is etched on each work piece will be a precisely accurate duplication of the pattern on the corresponding master piece. Pattern duplication is achieved by this method with an accuracy of .0015 inch.

If the ink or coating does not contain the ferro magnetic particles, then of course, the magnets or other magnetic means will have no effect on the coating which will rely on its own stability during the etching process but which, as explained above will give less accurate reproductions.

It is desirable that the ink coating (with or without the ferro magntic particles) on the work piece should be somewhat dried before the work piece is subjected to the action of the etching fluid. One way of providing for this is to apply a fine powder, such as asphaltum powder, to the surface of the work piece after the ink impression has been made thereon, and then to heat the work piece to a temperature of from 150° to 180° F. until the inked surface loses its glossy appearance. Heating the work piece to from one to five minutes will generally accomplish this end.

When thus treated the inked surface is protected so that it will not be disturbed or washed off by the turbulent action of the etching fluid while the work piece is in the tank 24.

The foregoing drying procedure will upgrade the accuracy of the reproductions whether the coating be without the magnetic particles, with the particles without the use of magnetic attraction means, or with the particles plus the magnetic attraction means.

While any suitable ferro magnetic material in powder form may be used in the ink or coating material, I prefer to use a pure nickel powder having a particle size of from 7 to 12 microns. The nickel powder is preferably magnetized before being mixed with the ink, although it could if necessary be magnetized after being introduced into the ink.

A suitable ink or coating material may be made according to the following formula (omitting the nickel powder if the stabilizing effect of the metal particles is not needed).

| | Percent by weight |
|---|---|
| Water | 2.5 |
| Animal glue | .5 |
| Egg albumen | 8 |
| Oils, mostly linseed oil | 45 |
| Nickel powder, 7–12 micron grain size | 2 |
| Carbon black | 42 |
| | 100 |

It is to be understood, however, the above proportions may be varied more or less without departing from the invention. An ink or coating material made according to some other formula may be used provided it is capable of acting as above described and it may or may not contain the ferro magnetic particles according to the required accuracy of reproduction. Furthermore, any suitable etching solution may be used, but I find good results are obtained with a solution containing, by weight:

| | Percent |
|---|---|
| Moisture | 64.1 |
| Solid material | 35.59 |
| Hydrochloric acid | .31 |
| | 100 |

I claim:

1. A method of etching for duplicating in a ferrous piece, a pattern formed by recessed areas in the surface of a master piece, said method comprising the steps of applying to the surface of the master piece a layer of acid resistant coating containing particles subject to magnetic attraction, passing a roller over the surface of said master piece to transfer to said roller acid resistant coating from said master piece and accurately defining on said roller the pattern of said master piece, passing said roller over said ferrous piece to deposit thereon acid resistant coating accurately defining the pattern of said master piece, maintaining the edges of the acid resistant coated area of said ferrous piece in constant position through the utilization of magnetic force on said particles and subsequently subjecting the ferrous piece to an acid bath to be etched at those areas not covered by said acid resistant coating.

2. A method of etching for duplicating in a magnetized ferrous piece, a pattern formed by recessed areas in the surface of a master piece, said method comprising the steps of applying to the surface of the master piece a layer of acid resistant coating containing particles subject to magnetic attraction, passing a roller over the surface of said master piece to transfer to said roller acid resistant coating from said master piece and accurately defining on said roller the pattern of said master piece, passing said roller over said ferrous piece to deposit thereon acid resistant coating accurately defining the pattern of said master piece, maintaining the edges of the acid resistant coated area of said ferrous piece in constant position through the utilization of the magnetic force of said ferrous piece on said particles and subsequently subjecting the ferrous piece to an acid bath to be etched at those areas not covered by said acid resistant coating.

3. A method of etching for duplicating in a metallic piece a pattern formed by recessed areas in the surface of a master piece, said method comprising the steps of applying to the surface of the master piece a layer of acid resistant coating containing ferro magnetic particles, passing a roller over the surface of said master piece to transfer to said roller said acid resistant coating from said master piece and accurately defining on said roller the pattern of said master piece, passing said roller over said metallic piece to deposit thereon said acid resistant coating accurately defining the pattern of said master piece, maintaining the edges of the acid resistant coated area of said metallic piece in constant position through the utilization of magnetic force emanating from a source located below said metallic piece and subsequently subjecting the metallic piece while said particles continue subject to said magnetic force to an acid bath to be etched at those areas not covered by said acid resistant coating.

4. A method of etching for duplicating in a metallic work piece a pattern formed by recessed areas in the surface of a master piece, said method comprising the steps of applying to the surface of the master piece a coating of acid resistant ink-like material containing ferro magnetic particles while maintaining the recessed areas free from said ink-like material, taking an impression of the coated surface of the master piece and transferring such impression to the surface of the work piece thereby defining on said work piece an accurate duplication of the pattern carried by the master piece, stabilizing magnetically the pattern defining edges of the ink impression on the work piece, and subsequently subjecting the work piece to an acid bath by which it is etched at those areas not covered by the acid resistant coating thereon.

5. The method set forth in claim 1 in which said particles have been magnetized prior to the application of said coating to said master piece and said master piece is nonmagnetic.

6. The method set forth in claim 2 in which said particles having been magnetized prior to the application of said coating to said master piece and said master piece is non-magnetic.

7. The method set forth in claim 3 in which said particles have been magnetized prior to the application of said coating to said master piece.

8. A method of etching for duplicating in a metallic piece, a pattern formed by recessed areas in the surface of a master piece, said method comprising the steps of applying to the surface of the master piece a layer of acid resistant coating containing magnetized metallic particles, transferring the coating and the pattern defined thereby from said master piece to said work piece in accurate registration therewith, maintaining through the behavior of said particles in cooperation with said coating the edges of the acid resistant coated area of said metallic piece in constant position and subsequently subjecting the metallic piece to an acid bath to be etched at those areas not covered by said acid resistant coating.

9. The method set forth in claim 3 including the step of angularly orienting the metallic piece to be in exact angular agreement with the master piece prior to the transfer of said resistant coating from the master piece to the metallic piece.

10. The method set forth in claim 1 including the step of angularly orienting the ferrous piece to be in exact angular agreement with the master piece prior to the transfer of said resistant coating from the master piece to the ferrous piece.

11. The method set forth in claim 2 including the step of angularly orienting the magnetized ferrous piece to be in exact angular agreement with the master piece prior to the transfer of said resistant coating from the master piece to the magnetized ferrous piece.

12. A method for duplicating in a metallic piece a pattern formed by recessed areas in the surface of a master piece and in which the metallic piece is an exact dimensional duplicate of said master piece and in which both said metallic and master pieces there must be exact angular orientation of each piece with respect to the pattern, said method comprising the steps of applying to the surface of the master piece a layer of acid resistant coating containing magnetized metallic particles, passing a roller over the surface of said master piece to transfer to said roller said acid resistant coating from said master piece and accurately defining on said roller the pattern of said master piece, passing said roller over said metallic piece which has been angularly oriented to correspond exactly to the position of said master piece to deposit on said metallic piece said acid resistant coating accurately defining the pattern of said master piece in correct oriented relationship, maintaining through the behavior of said magnetized particles in cooperation with said coating, the edges of the said acid resistant coated area of said metallic piece in constant position and subsequently subjecting the metallic piece to an acid bath to be etched at those areas not covered by said acid resistant coating.

13. A method of etching for duplicating in a metallic work piece a pattern formed by recessed areas in the surface of a master piece, said method comprising the steps of applying to the surface of the master piece a slow-flowing coating containing ferro-magnetic particles while maintaining the recessed areas free from said coating, taking an impression of the coated surface of the master piece and transferring such impression to the surface of the work piece thereby defining on said work piece an accurate duplication of the pattern carried by the master piece, stabilizing the pattern defining the edges of the impression on the work piece by applying a magnetic force to said particles acting in the direction of said work piece thereby providing closer adhesion between the coating and work piece, and subsequently subjecting the work piece to an acid bath by which it is etched at those areas not covered by the said slow-flowing coating.

14. A method of etching for duplicating in a metallic work piece a pattern formed by recessed areas in the surface of a master piece, said method comprising the steps of applying to the surface of the master piece a slow-flowing acid resistant coating containing magnetized ferrous particles while maintaining the recessed areas free from said coating, taking an impression of the coated surface of the master piece and transferring such impression to the surface of the work piece thereby defining on said work piece an accurate duplication of the pattern carried by the master piece, utilizing the magnetic attraction of the said particles for each other for increasing the coating strength and for aiding in maintaining the pattern outline on the said work piece, and subsequently subjecting the work piece to an acid bath by which it is etched on those areas not covered by the acid resistant coating.

15. A method of etching for duplicating in a metallic work piece a pattern formed by recessed areas in the surface of a master piece, said method comprising the steps of applying to the surface of the master piece a layer of acid-resistant coating containing particles of ferro-magnetic material while maintaining the recessed areas free from said coating, taking an impression of the coated surface of the master piece and transferring such impression to the surface of the work piece thereby defining on said work piece an accurate duplication of the pattern carried by the master piece, maintaining the edges of the acid resistant, coated area of said metallic piece in constant position by the application of magnetic force to said particles urging said particles in the direction of said work piece, and subsequently subjecting the metallic work piece to an acid bath to be etched at those areas not covered by said acid resistant coating.

16. A method of duplicating in a metallic work piece a pattern formed by recessed areas in the surface of a master piece and in which the metallic piece is an exact dimensional duplicate of said master piece and in which both said metallic and master pieces there must be an exact angular orientation of each piece with respect to the pattern, said method comprising the steps of applying to the surface of the master piece a layer of acid resistant coating containing ferro-magnetic particles, passing a roller over the surface of said master piece to transfer to said roller said acid resistant coating from said master piece and accurately defining on said roller the pattern of said master piece, passing said roller over said metallic work piece which has been angularly oriented to correspond exactly to the position of said master piece to deposit on said metallic work piece said acid resistant coating accurately defining the pattern of said master piece in correct, oriented relationship, maintaining the edges of the said acid resistant, coated area of said metallic work piece in constant position by utilizing magnetic attraction on the said particles for providing closer adhesion between the said coating and the said metallic work piece by urging said particles in the direction of said metallic work piece, and subsequently subjecting the metallic work piece to an acid bath to be etched at those areas not covered by said acid resistant coating.

17. A method for duplicating in a metallic non-magnetic work piece a pattern formed by recessed areas in the surface of a master piece and in which the said metallic work piece is an exact dimensional duplicate of said master piece and in which both said metallic work and master pieces there must be exact angular orientation of each piece with respect to the pattern, said method comprising the steps of applying to the surface of the master piece a layer of acid resistant coating containing magnetized ferrous particles, passing a roller over the surface of said master piece to transfer to said roller said acid resistant coating from said master piece and accurately defining on said roller the pattern of said master piece, passing said roller over said metallic work piece which has been angularly oriented to correspond exactly to the position of said master piece to deposit on said metallic piece said acid resistant coating accurately defining the pattern of said master piece in correct oriented relationship, maintaining the edges of the said acid resistant coated area of said metallic work piece in said position by utilizing magnetic attraction on the said particles in the direction of said metallic piece for providing closer adhesion between the coating and the metallic work piece, and subsequently subjecting the metallic piece to an acid bath to be etched at those areas not covered by said acid resistant coating.

18. The method set forth in claim 12 in which the said edges of said coated area are maintained in position on said metallic piece by the application of additional magnetic force to said particles urging said particles in the direction of said metallic piece.

19. The method of transferring accurate patterns from a master piece to a metallic work piece including a new use of an offset press having a press roll, comprising the steps of positioning in said press a plurality of master pieces each bearing a pattern formed by recessed areas in said master pieces, positioning a corresponding plurality of metallic work pieces in said press each longitudinally aligned with a corresponding master piece and at a distance equal to the circumference of the press roll, applying an acid resistant coating containing ferro-magnetic particles to the surface of said master pieces, passing said press roll simultaneously over the surfaces of said master pieces to transfer to said roll said acid resistant coating from said master pieces to accurately define on said roll the patterns of said master pieces, passing said roll over said corresponding metallic work pieces to deposit thereon said acid resistant coating accurately defining the patterns of said master pieces, maintaining the edges of said acid resistant coating on said metallic work pieces in constant position through the utilization of magnetic force effective on said particles thereby to stabilize said coating and subsequently subjecting the metallic work pieces to an acid bath to be etched at those areas not covered by said acid resistant coating.

20. The method of producing patterns in the form of recessed areas in a work piece corresponding exactly to patterns in the form of recessed areas in a master piece, said method including a new use of an offset press having a press roll, comprising the steps of positioning in said press master pieces each bearing a pattern formed by recessed areas in each said master piece, positioning corresponding metallic work pieces in said press each longitudinally aligned with a corresponding master piece and at a distance equal to the circumference of the press roll, applying an acid resistant coating to the upper surface of each said master piece below which lies the said recessed area, passing said press roll over the surfaces of each said master piece to transfer to said roll said acid resistant coating from each said master piece to accurately define on said roll the outer borders of said recessed areas that constitute said patterns of said master pieces, passing said roll over each said corresponding metallic work piece to deposit thereon said acid resistant coating accurately defining the said outer border of said recessed area that constitutes said pattern of each said master piece and subsequently subjecting each metallic work piece to an acid bath to be etched at those areas within said outer border and not covered by said acid resistant coating.

References Cited in the file of this patent

UNITED STATES PATENTS

| | | |
|---|---|---|
| 1,968,370 | Burns | July 31, 1934 |
| 2,662,002 | Sunderhauf et al. | Dec. 8, 1953 |